UNITED STATES PATENT OFFICE.

STUART BENTON MOLONY, OF WELLESLEY HILLS, MASSACHUSETTS, ASSIGNOR TO MICHIGAN CHEMICAL COMPANY, A CORPORATION OF MICHIGAN.

RUBBER VULCANIZATION AND THE PRODUCT THEREOF.

1,343,224.      Specification of Letters Patent.      Patented June 15, 1920.

No Drawing.      Application filed June 17, 1919. Serial No. 304,838.

*To all whom it may concern:*

Be it known that I, STUART B. MOLONY, a citizen of the United States, residing at Wellesley Hills, in the county of Norfolk and State of Massachusetts, have invented certain new and useful Improvements in Rubber Vulcanization and the Products Thereof, of which the following is a specification.

The invention relates to the vulcanization of rubber. It has for its principal objects the provision of a process, whereby the rapidity of vulcanization is increased, and which can be practised at a minimum expense, with a relatively small quantity of the accelerating agent, and the provision of a product, which is of superior quality and durability.

The accelerating compound is produced from beet sugar molasses or its residue. This residue is subjected to a dry distillation (also known as a destructive distillation) in retorts at a temperature of 900 to 1300 degrees F. The vapors or gases produced in the distillation in the retort may be used as such in forming the compound, or may be conducted through an acid to neutralize them. The acid used is preferably sulfuric acid about 2500 cubic centimeters being used at a strength of 60 Bé. The resulting liquid is evaporated whereby ammonium salts crystallize out. These ammonium salts are preferably removed by any suitable procedure such as centrifugal action. The liquid remaining contains the ingredients constituting the essential part of the accelerating agent. This liquid is treated with an alkali such as quick lime to decompose it and the vapor produced is passed through an absorbent comprising carbon disulfid which combines therewith. The liquid is then subjected to centrifugal action or evaporated to separate the compound which constitutes the accelerator.

The compound thus produced is of a complex composition including amin bases and a number of other ingredients which act independently or coöperate to give the catalytic action incident to the use of accelerators in the vulcanization of rubber. I believe that the accelerating action of the compound is due to one or more amin bases contained in the compound the identity thereof being more or less uncertain, as well as the individual effect of such bases. My information as to their action is limited to the fact that one or more of them in conjunction with the other ingredients of the compound produce the desired effect. In the process as above set forth crystals of ammonium salts are described as being removed from the compound, but this is not necessary as these ammonium salts have no unfavorable effect if left in the compound, the reason for their removal being merely to conserve them for other uses. By the term amin bases is meant ammonia $NH_3$ with the group $CH_3$ or its homologues substituted for one or more of the hydrogen atoms in the compound. As a matter of economy it is also preferable to use the residue from beet sugar molasses instead of the molasses itself, but the process is not limited to using the residue as a starting point in the production of the compound.

The compound produced may be used satisfactorily in the vulcanization process according to the following formula as an example:

100 parts by weight of plantation rubber,
50 parts by weight of zinc oxid,
5 parts by weight of sulfur,
$\frac{1}{4}$ part by weight of the accelerating compound.

The proportions of sulfur and accelerating agent, may, of course, be modified to meet the requirements as to the kind of rubber which is to be produced. At a temperature of from 135 to 145 degrees centigrade in a press the vulcanization is complete in about ten minutes. The process may also be practised with synthetic, reclaimed, or other forms of rubber.

The quantity of accelerating agent as required by this process is relatively small as compared with other accelerating agents with which I am familiar and the rubber produced is of a superior quality and durability. The accelerator will work well with litharge contrary to most accelerators.

This accelerator makes possible vulcanization at a very low temperature, a good cure in the above compound taking place in an hour at 108 degrees centigrade provided the salts of lead, or compounds of the metals whose reactions in the presence of sulfur are similar to lead, such as copper, are not present. If $\frac{1}{10}$ per cent. of lead oxid (litharge) is present the temperature necessary for vulcanization is raised and vulcanization does not take place at 108 degrees C. although at the regular vulcanizing temperature the litharge has no retarding effect. This peculiarity makes it possible to modify the action of this accelerator through the use of small quantities of lead salts.

What I claim is:

1. The process of accelerating the vulcanization of rubber which consists in vulcanizing the rubber by sulfur and in the presence of a compound produced from beet sugar residue and including the amin bases formed therefrom in combination with carbon disulfid.

2. The process of accelerating the vulcanization of rubber which consists in vulcanizing the rubber in the presence of a compound of the amin bases produced from beet sugar residue combined with carbon disulfid.

3. The process of accelerating the vulcanization of rubber which consists in vulcanizing the rubber in the presence of a compound of the amin bases produced by destructive distillation from beet sugar residue combined with carbon disulfid.

4. The process of accelerating the vulcanization of rubber which consists in vulcanizing the rubber in the presence of a compound of the amin bases produced by destructive distillation from beet sugar molasses residue combined with carbon disulfid.

5. The process of accelerating the vulcanization of rubber which consists in vulcanizing the rubber in the presence of a compound produced by the combination with carbon disulfid of the amin bases contained in the products of the destructive distillation of beet sugar residue.

6. The process of accelerating the vulcanization of rubber which consists in vulcanizing the rubber in the presence of a compound produced from beet sugar residue and inculding the amin bases formed therefrom, after the ammonium products have been removed therefrom, in combination with carbon disulfid.

7. The process of accelerating the vulcanization of rubber which consists in vulcanizing the rubber in the presence of a compound of lead by the use of a compound produced from beet sugar residue and including the amin bases formed therefrom in combination with carbon disulfid.

8. As a new article of manufacture vulcanized rubber combined before vulcanization with a compound formed by the destructive distillation of beet sugar residue and including the amin bases thus produced combined with carbon disulfid.

9. As a new article of manufacture vulcanized rubber combined before vulcanization with a compound of the amin bases produced from beet sugar residue combined with carbon disulfid.

10. As a new article of manufacture vulcanized rubber combined before vulcanization with a compound of the amin bases produced by destructive distillation from beet sugar residue combined with carbon disulfid.

11. As a new article of manufacture vulcanized rubber combined before vulcanization with a compound of the amin bases produced by destructive distillation from beet sugar molasses residue combined with carbon disulfid.

12. As a new article of manufacture vulcanized rubber combined before vulcanization with a compound of lead and with a compound formed by the destructive distillation of beet sugar residue and including the amin bases thus produced combined with carbon disulfid.

STUART BENTON MOLONY.